US007255641B1

(12) United States Patent
Atkinson et al.

(10) Patent No.: US 7,255,641 B1
(45) Date of Patent: Aug. 14, 2007

(54) LIQUID RACING GAME

(75) Inventors: John W. Atkinson, Brownsburg-Chatham (CA); Jack D. Cook, II, Ormond Beach, FL (US); Richard W. Lawand, Ile Bizard (CA)

(73) Assignee: Bob's Space Racers, Inc., Daytona Beach, FL (US)

( * ) Notice: Subject to any disclaimer, the term of this patent is extended or adjusted under 35 U.S.C. 154(b) by 873 days.

(21) Appl. No.: 10/664,525

(22) Filed: Sep. 17, 2003

Related U.S. Application Data

(60) Provisional application No. 60/424,235, filed on Nov. 6, 2002, provisional application No. 60/412,126, filed on Sep. 18, 2002.

(51) Int. Cl.
*A63F 13/00* (2006.01)

(52) U.S. Cl. .......................................... 463/7; 273/349

(58) Field of Classification Search ........ 273/348–351, 273/353–355; 463/6, 7
See application file for complete search history.

(56) References Cited

U.S. PATENT DOCUMENTS

| | | | | |
|---|---|---|---|---|
| 3,336,030 | A * | 8/1967 | Martell et al. | 273/349 |
| 3,342,492 | A * | 9/1967 | Barrett | 273/349 |
| 3,572,712 | A | 3/1971 | Vick | 273/86 |
| 4,040,622 | A | 8/1977 | Sinnott | 273/86 R |
| 4,077,629 | A | 3/1978 | Chestney | 273/101 |
| 4,363,483 | A | 12/1982 | Minami | 273/85 C |
| 4,530,499 | A | 7/1985 | Breslow et al. | 273/1 GC |
| 5,435,569 | A | 7/1995 | Zilliox | 273/349 |
| 5,439,230 | A * | 8/1995 | Mendes, Jr. | 273/349 |
| 5,549,303 | A | 8/1996 | Kastner | 273/349 |
| 5,566,950 | A * | 10/1996 | Senna | 463/60 |
| 5,573,243 | A * | 11/1996 | Bartosik | 463/60 |
| 5,595,387 | A | 1/1997 | Senna | 273/369 |
| 5,865,438 | A | 2/1999 | Zilliox | 273/349 |
| 5,954,338 | A * | 9/1999 | Hampton | 273/349 |
| 6,428,411 | B1 | 8/2002 | Togami | 463/4 |

* cited by examiner

*Primary Examiner*—Robert E. Pezzuto
*Assistant Examiner*—Alex F. R. P. Rada, II
(74) *Attorney, Agent, or Firm*—Standley Law Group LLP

(57) ABSTRACT

A liquid racing game is described. The game preferably includes a liquid outlet such as a water spout and a vessel to catch a flow of a liquid, such as water, from the spout. A player controls the lateral motion of the vessel by a joystick. The spout moves laterally at speeds and patterns which may be programmed on a control board. The object is to fill the vessel with water from the moving spout. The game is a race to fill the vessel. Coin operated versions are possible which dispense tickets or tokens to redeem for prizes. Operator versions are possible in which an operator starts the race and distributes a prize to the winner. The game may also be played as a video game version.

34 Claims, 8 Drawing Sheets

LIQUID RACING GAME

This application claims the benefit of U.S. Provisional Application Nos. 60/412,126 filed Sep. 18, 2002 and 60/424,235 filed Nov. 6, 2002.

BACKGROUND AND SUMMARY OF THE INVENTION

The present invention relates generally to a liquid racing game.

The racing game involves manipulating the position of a vessel at a source of a liquid for filling the vessel in order to attain a certain level of the liquid within a given amount of time, or to be the first among a group of players to fill the vessel with the liquid to a certain level. The object of the game is to control the movement of the vessel in order to catch a quantity of a liquid sufficient to determine a winner or the achievement of the capture of a required quantity of a liquid in the vessel. In addition, the movement of the outlet for the delivery of the source of liquid may be separately controlled, thus presenting an additional challenge to the player of the game by requiring their manipulation of their vessel's position to match their respective liquid outlet in order to receive liquid into the vessel.

The outlet for the liquid delivery is controlled to operate at variable speeds and variable directions in variable sequences. The vessel may be independently controlled in its direction and speed by a respective player. Multiple players may race against one another to determine which player is able to capture a sufficient quantity of liquid that would activate a liquid detection device and signal a winner. Additionally, the game may be used by one player to race against a given time interval. A predetermined quantity of liquid captured by the single player may signal the award of a prize, tokens, or tickets that relate to the player's achievement level. Another variation of the present invention allows for a multiple player game wherein opposing players would independently control the positions of a liquid outlet and a vessel, respectively.

Another variation of the game involves a plurality of fixedly mounted liquid outlets. In this example, the object of the game would be for the player to fill his vessel by positioning the vessel under the appropriate one of the plurality of liquid outlets that would be delivering a quantity of a liquid at that moment. Liquid could be delivered by more that one outlet at any particular time. A processor running a computer program may control the liquid delivery through the plurality of liquid outlets. Alternatively, the delivery of the liquid could be randomly controlled by a processor or a mechanical valve. In the usual course of game play, no single delivery of liquid through an outlet would normally be sufficient to fill the vessel, thus requiring a player to move his vessel to several positions in an attempt to fill his vessel quickly within a given time frame. Alternatively, a player may be playing in order to be the first to fill his vessel when playing against other players playing their respective vessel under the plurality of liquid outlets. Another variation would include other players playing their respective vessel under each of their respective plurality of liquid outlets. Another variation of the game may include the delivery of the liquid through the plurality of liquid outlets to be controlled by a second game player.

The present invention also includes versions of the games that may be played as a video game. Such versions of the present invention may include a video game machine comprised of a monitor, a processor, and at least one player interface. This example of the present invention would use the monitor for displaying a playing field image and at least one player controllable image such as the vessel or the liquid outlet. A processor would be utilized to generate the images on the monitor and also for managing game play. The player interface is intended to be any of the typical variations of equipment used by a player for the input of player control into the game. The interface may be comprised of a button, a joystick, a ball, a steering wheel, finger-on-glass, or a touch sensitive interface. For example, the player interface could be a three dimensional replica of the player controlled image found on the video game screen, such as a pitcher, a mug, or the handle on a beer tap.

In addition to the novel features and advantages mentioned above, other objects and advantages of the present invention will be readily apparent from the following descriptions of the drawings and preferred embodiments.

DETAILED DESCRIPTION OF PREFERRED EMBODIMENT(S)

FIGS. 1 through 5 show one example embodiment of the game of the present invention. The embodiment of the present invention is a game comprised of a liquid outlet designed to look like a beer tap 20 and a pitcher 30 to catch a flow of water from the tap. A player controls the lateral motion of the pitcher by a joystick. The tap moves laterally at speeds and patterns that may be programmed on a control board. The object is to fill the pitcher with water from the moving tap. The game is a race to fill the pitcher. Coin operated versions are possible which dispense tickets or tokens to redeem for prizes. Operator versions are possible in which an operator starts the race and distributes a prize to the winner.

An example embodiment of the present invention will provide about ten player positions. The game could be an operator version. The spout and pitcher movement may be compressed air activated. The spout and pitcher may also be moved by stepper motors to allow precise programming of the movement. The spout and pitcher can operate at variable speeds and movement sequences that can be controlled.

Figure 1:
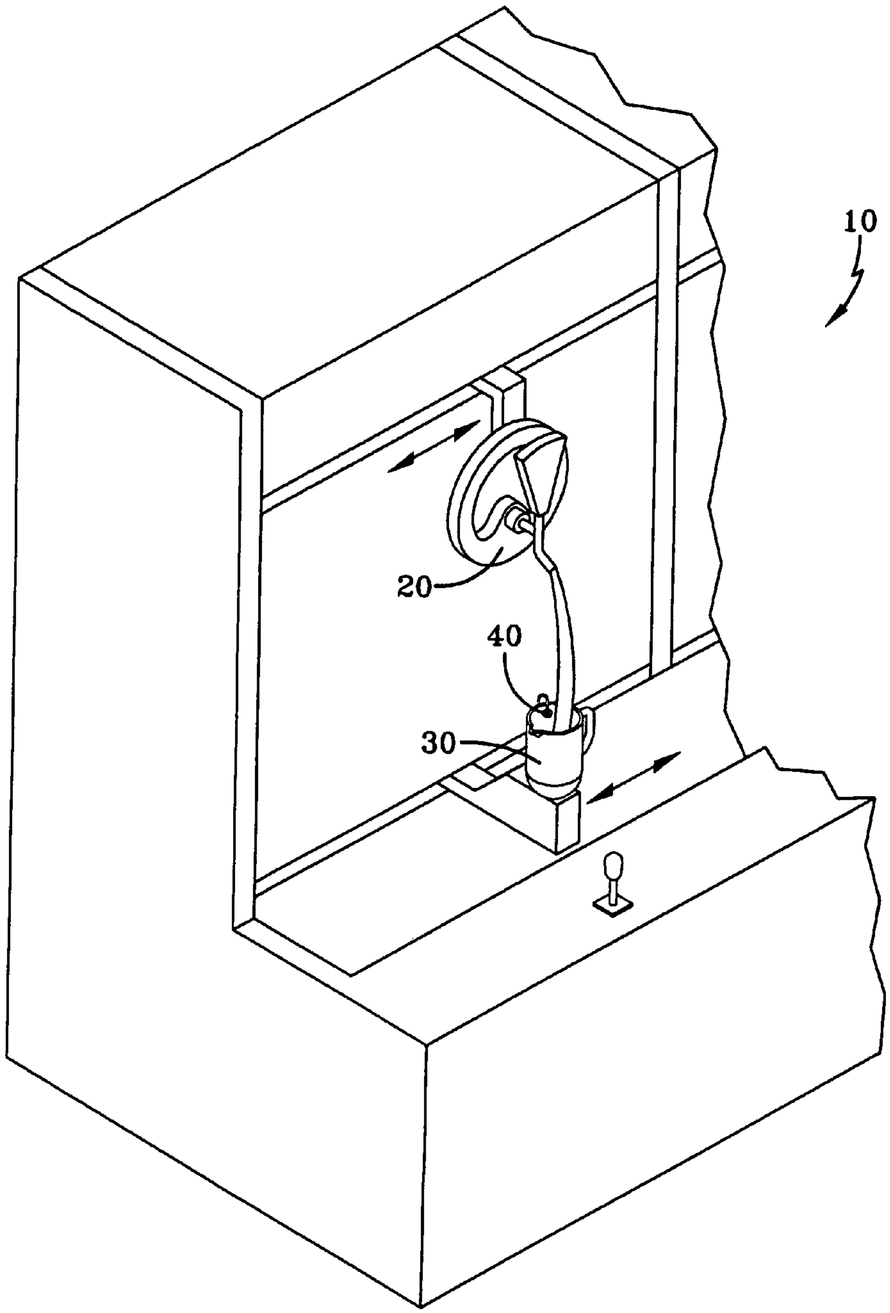
FIG. 1 is a pictorial view of an example embodiment of a game of the present invention.

As shown in FIG. 1, the console 10 is shown with the liquid outlet appearing as a beer tap 20 located in a position over the top of a vessel appearing as a pitcher 30 so that water fills the pitcher. Also shown is a liquid detection device, in this embodiment a float switch 40, that will provide a signal to the game processor when a sufficient quantity of water is contained within the pitcher 30 to reach a specific level.

Figure 2:
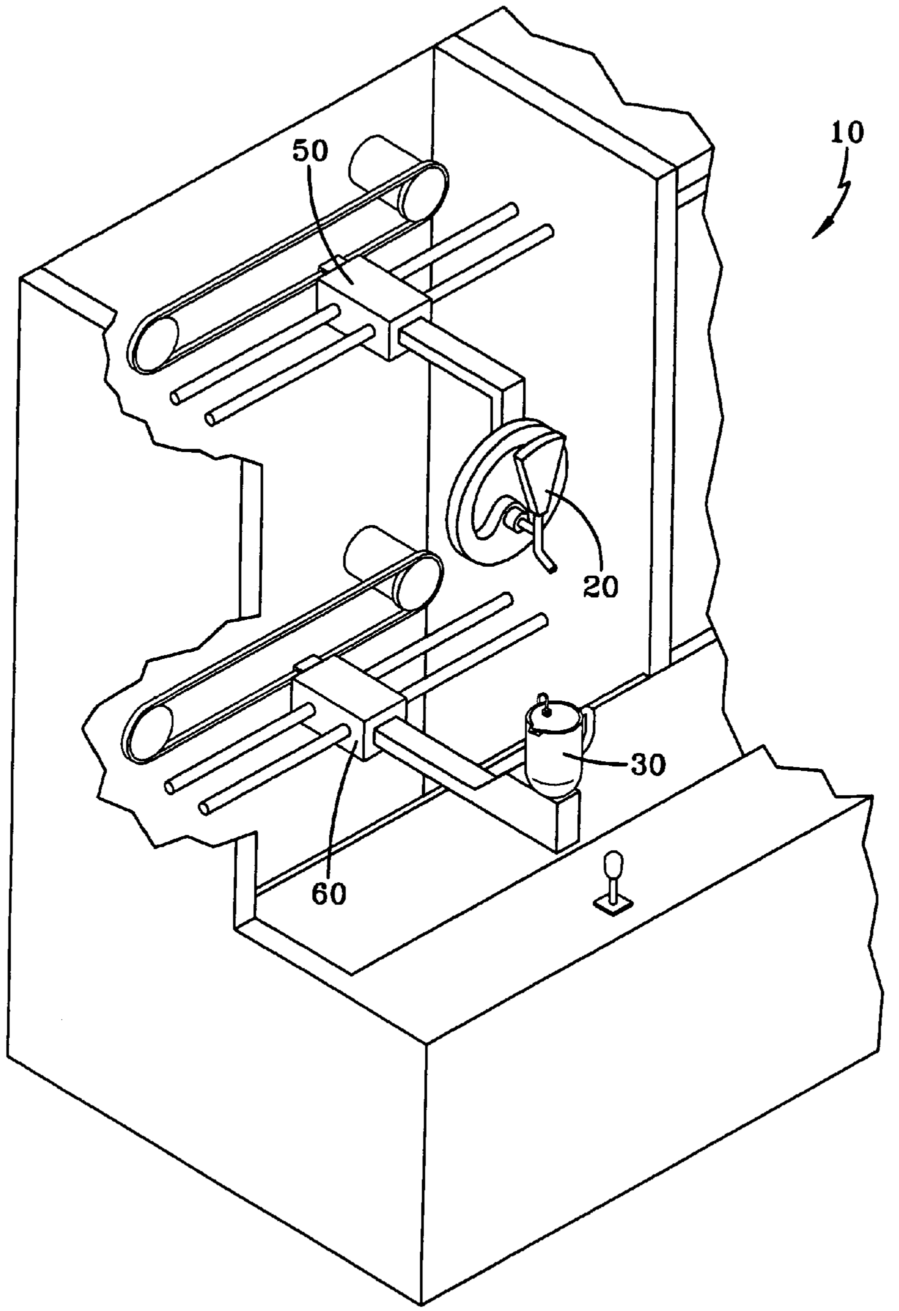
FIG. 2 is a pictorial view of an example embodiment of a game of the present invention.

FIG. 2 provides an example of a first variable positioning mount 50 that allows for the movement of the beer tap 20. In this example, the mount 50 is supported on a set of parallel rods and moved by a chain driven mechanism. The mount 50 moves horizontally on the parallel rods, allowing the beer tap to also move in a horizontal direction. The present invention allows for the movement of a spout or other similar liquid outlet such as the beer tap 20 to move in variable directions and at variable speeds. The processor of the present invention may control such movement. The movement may be programmed or randomly applied to the mount 50. A simple mechanically actuated means, such as cam or gears either independently operating or in a combination thereof, may also be used to move the mount 50 to different positions and at different speeds.

FIG. 2 also shows an example of the second variable positioning mount 60 that allows for the movement of the pitcher 30. In this embodiment of the present invention, the mount 60 is supported by a set of parallel rods and moved by a chain driven mechanism. Lateral movement is allowed by the mechanism in this present example. In this example, the movement of the mount 60 and thusly the pitcher 30 are controlled by the player of the game as the player attempts to catch water coming from the moving beer tap 20. The present invention may allow the player to control the vessel, such as the pitcher 30 shown, in any direction.

Figure 3:
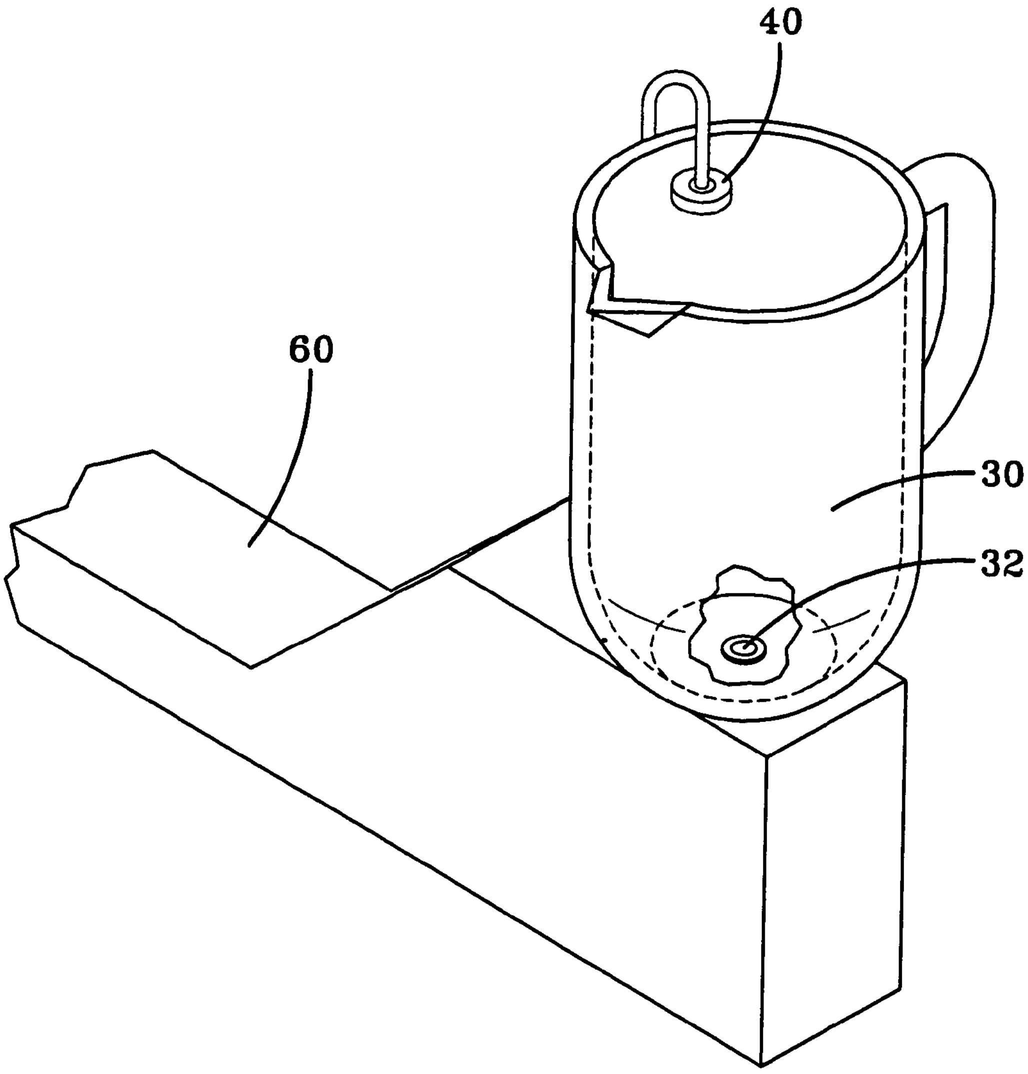
FIG. 3 is a pictorial view of an example embodiment of a game of the present invention.

FIG. 3 shows an example of the pitcher 30. The float switch 40 is shown mounted inside the pitcher 30. The float switch 40 can generate a signal to send to the game processor as an indicator of a player winning the game upon capturing a sufficient quantity of water to reach a specific level in the pitcher 30. In addition, a valve 32 is shown in the bottom of the pitcher 30. The valve 32 is positioned to allow the water to drain from the pitcher 30 at the conclusion of a game in order to reset the present invention for the playing of a subsequent session of the game. The valve 32 may be either operator controlled or controlled by the game processor. FIG. 3 also shows another view of the second variable positioning mount 60 as described for FIG. 2.

Figure 4:
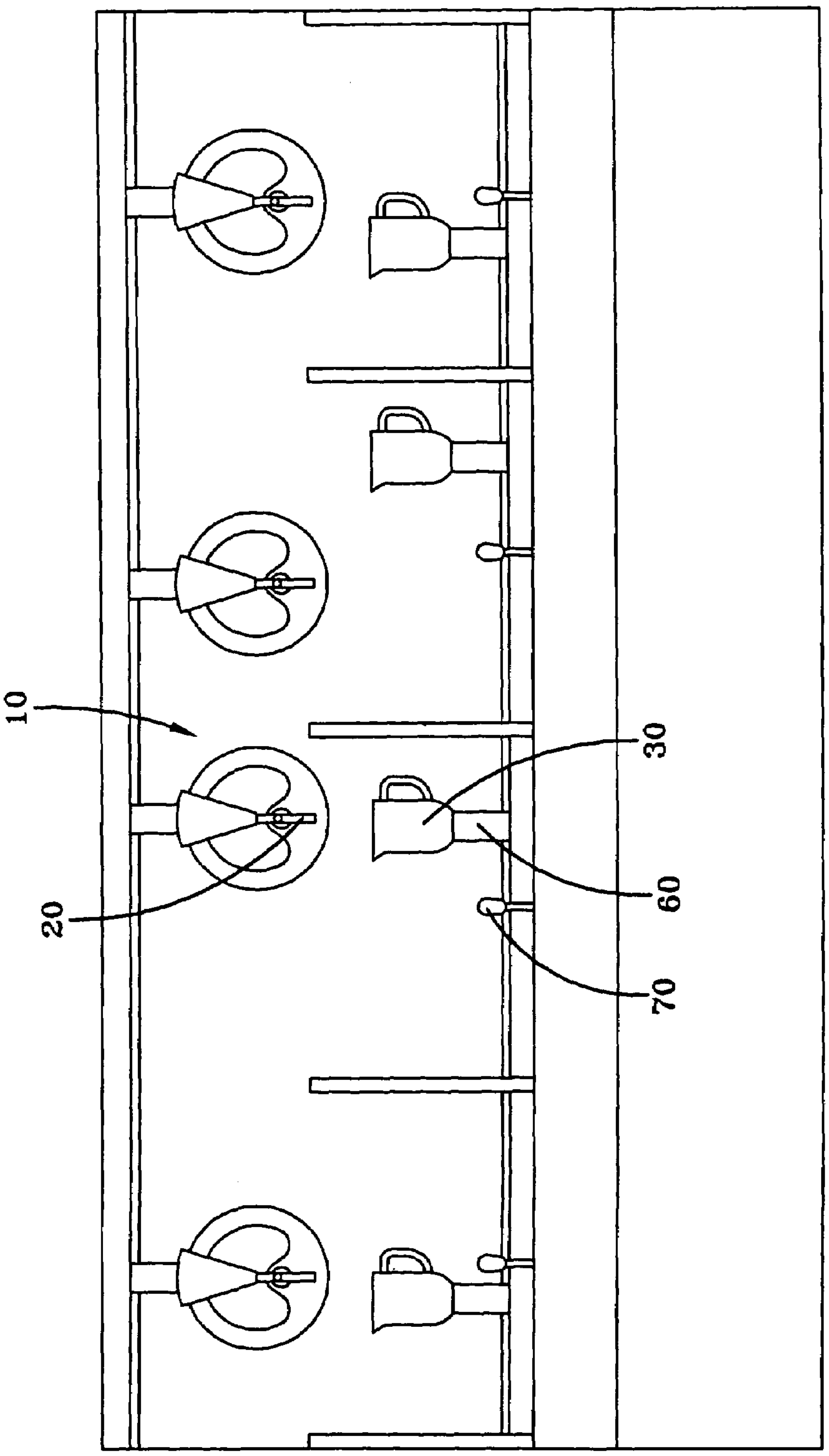
FIG. 4 is a pictorial view of an example embodiment of a game of the present invention.

FIG. 4 is a view of an example console 10 of the present invention. It should be noted that a console may contain a single game unit to accommodate one player at a time or the console may contain a plurality of game units to allow simultaneous playing between multiple players. In addition, a single game unit may also contain a timer so as to allow multiple players to compete against one another. FIG. 4 shows the beer tap 20, pitcher 30 and a portion of the second variable positioning mount 60. In addition, a joystick 70 is shown as an example of a player interface of the present invention wherein the player controls the position of the pitcher 30 during the game play.

Figure 5:
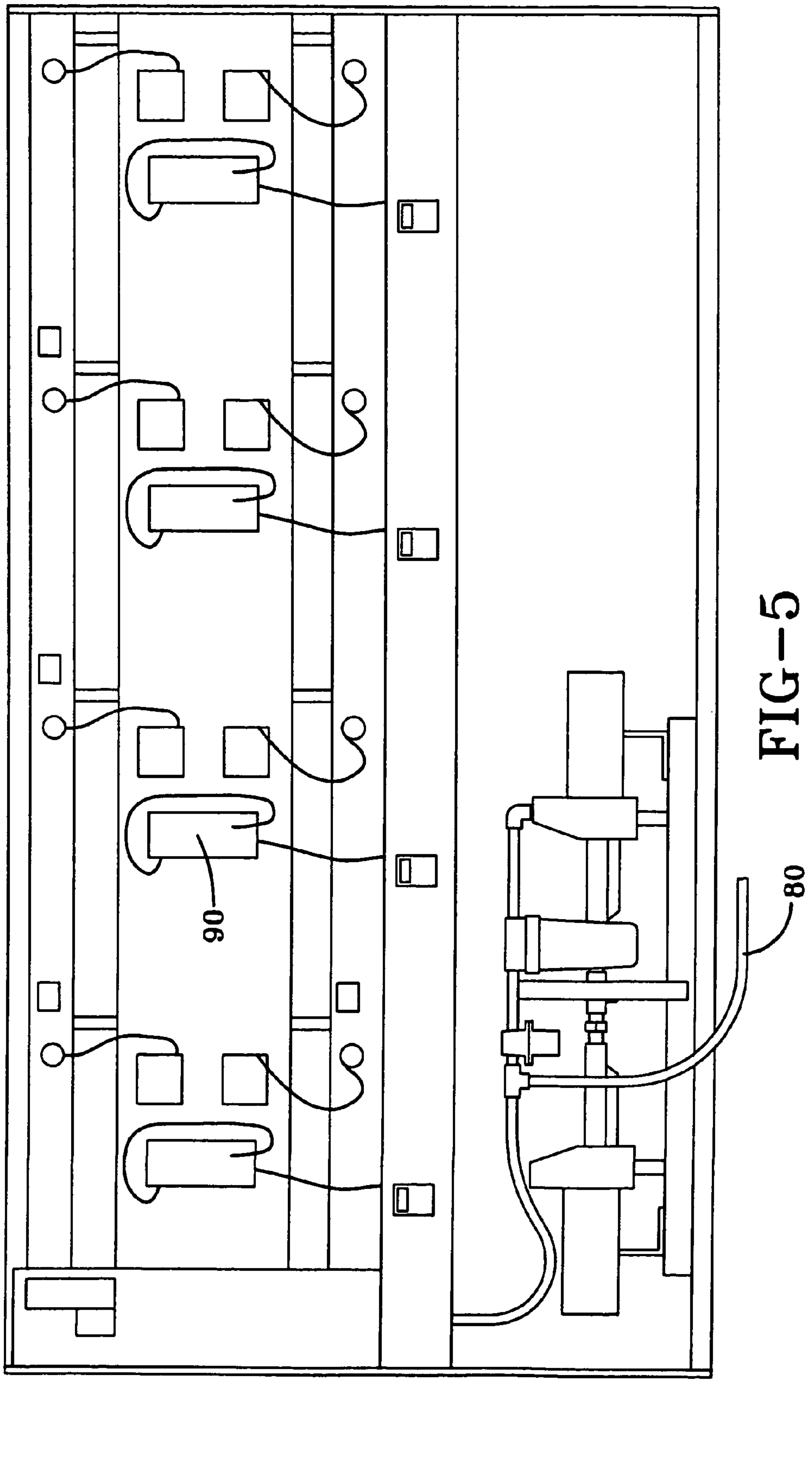
FIG. 5 is a pictorial view of an example embodiment of a game of the present invention.

FIG. 5 is a view of the back of an example embodiment of the present invention. Note that pumps, piping and a filter housing are shown as a portion of the plumbing to deliver a source of liquid 80 for the handling of water in this example of the present invention. This view of an example embodiment of the present invention also shows an example processor 90 that is in communication with the liquid detection device, such as the float valve 40 shown earlier.

Figure 6:
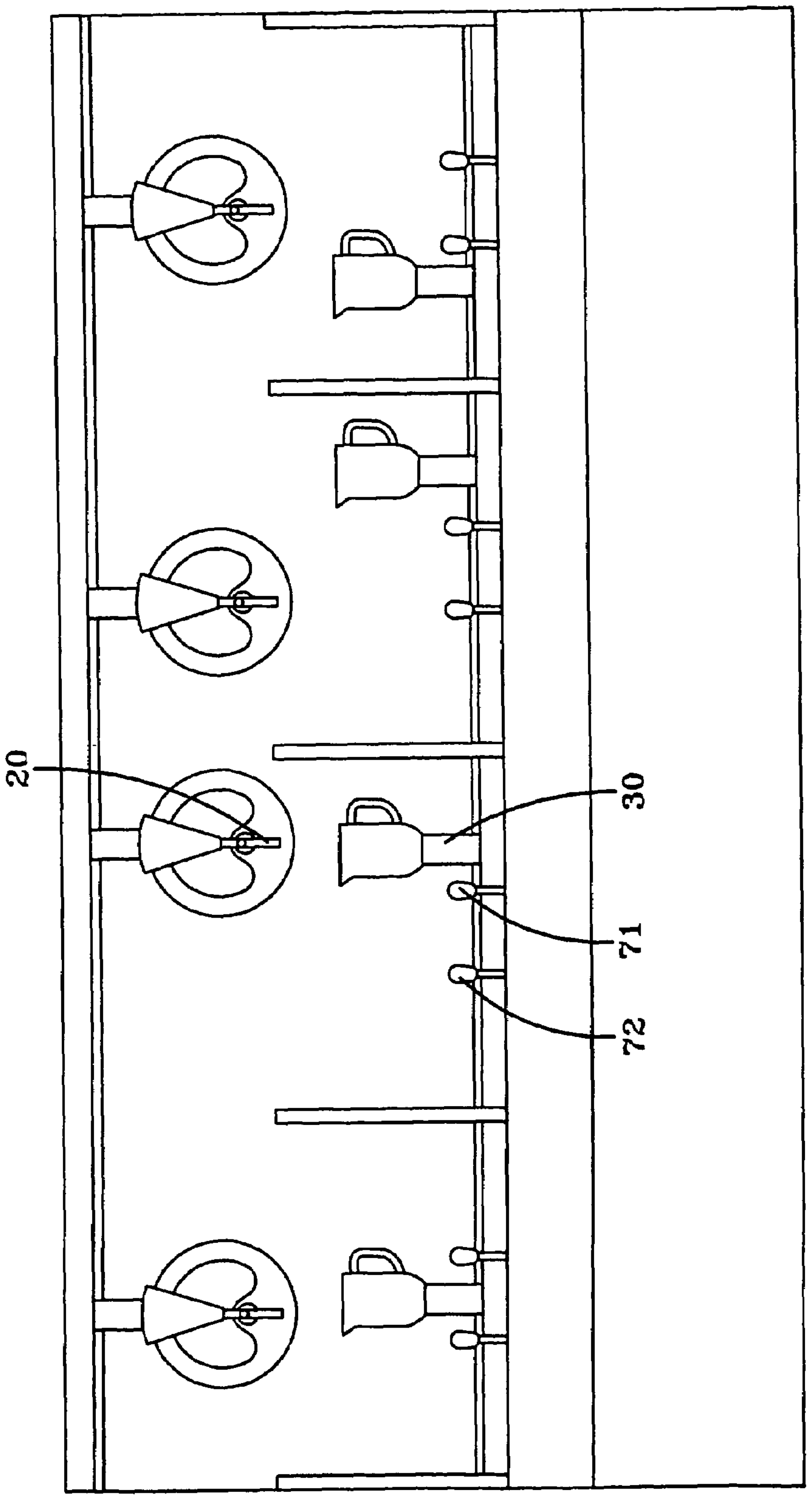
FIG. 6 is a pictorial view of an example embodiment of a game of the present invention.

FIG. 6 shows another example embodiment of the present invention. In this example, a first player interface, such as the joystick 71, is used to control the position of a liquid outlet, shown as a beer tap at 20. A second player interface, shown as the joystick at 72, is used to control the position of the vessel, shown as a pitcher 30. In this example embodiment, one player controlling the movement of the tap 20 may attempt to prevent a second player from filling the pitcher 30 under his control.

Figure 7:
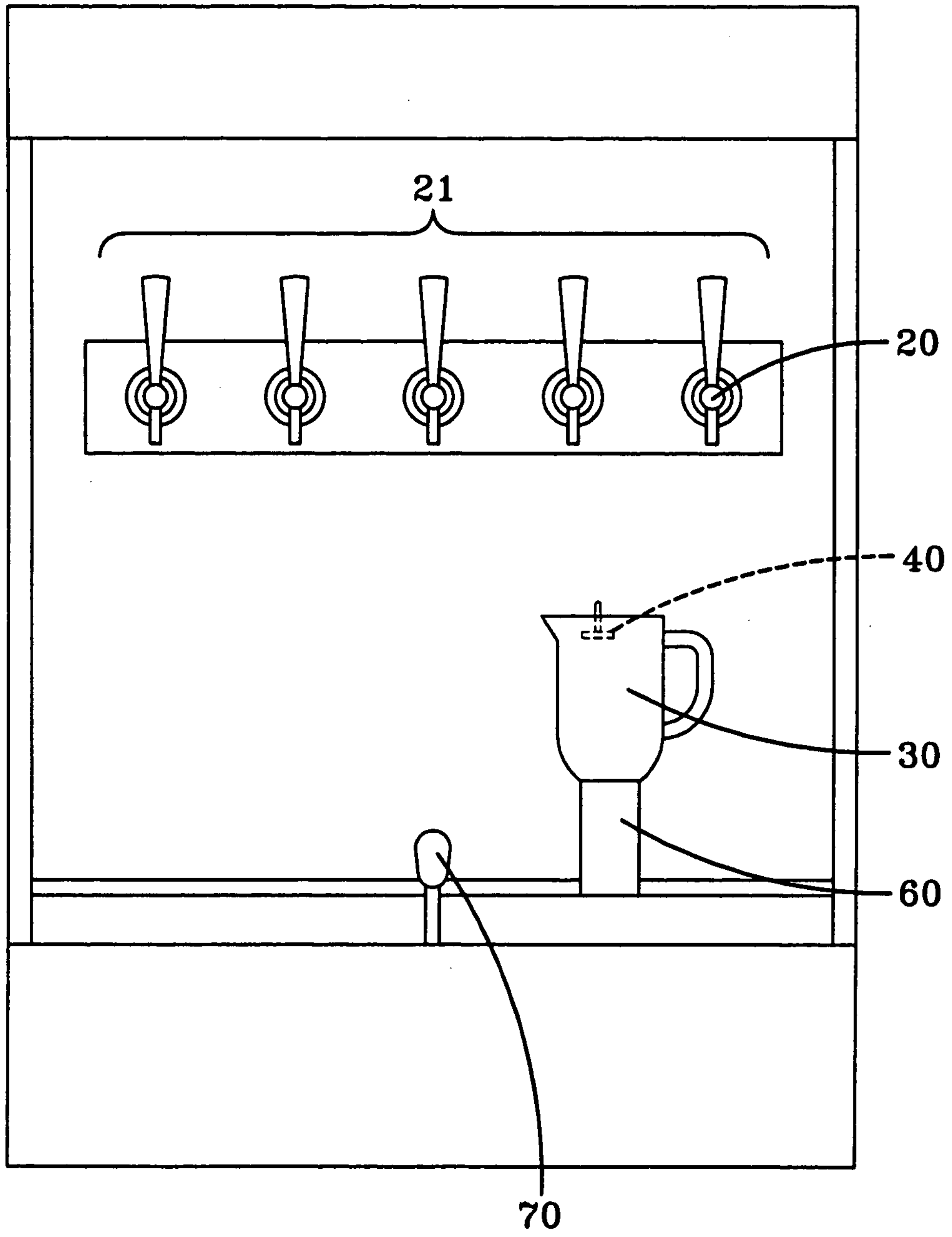
FIG. 7 is a pictorial view of an example embodiment of a game of the present invention.
Figure 8:
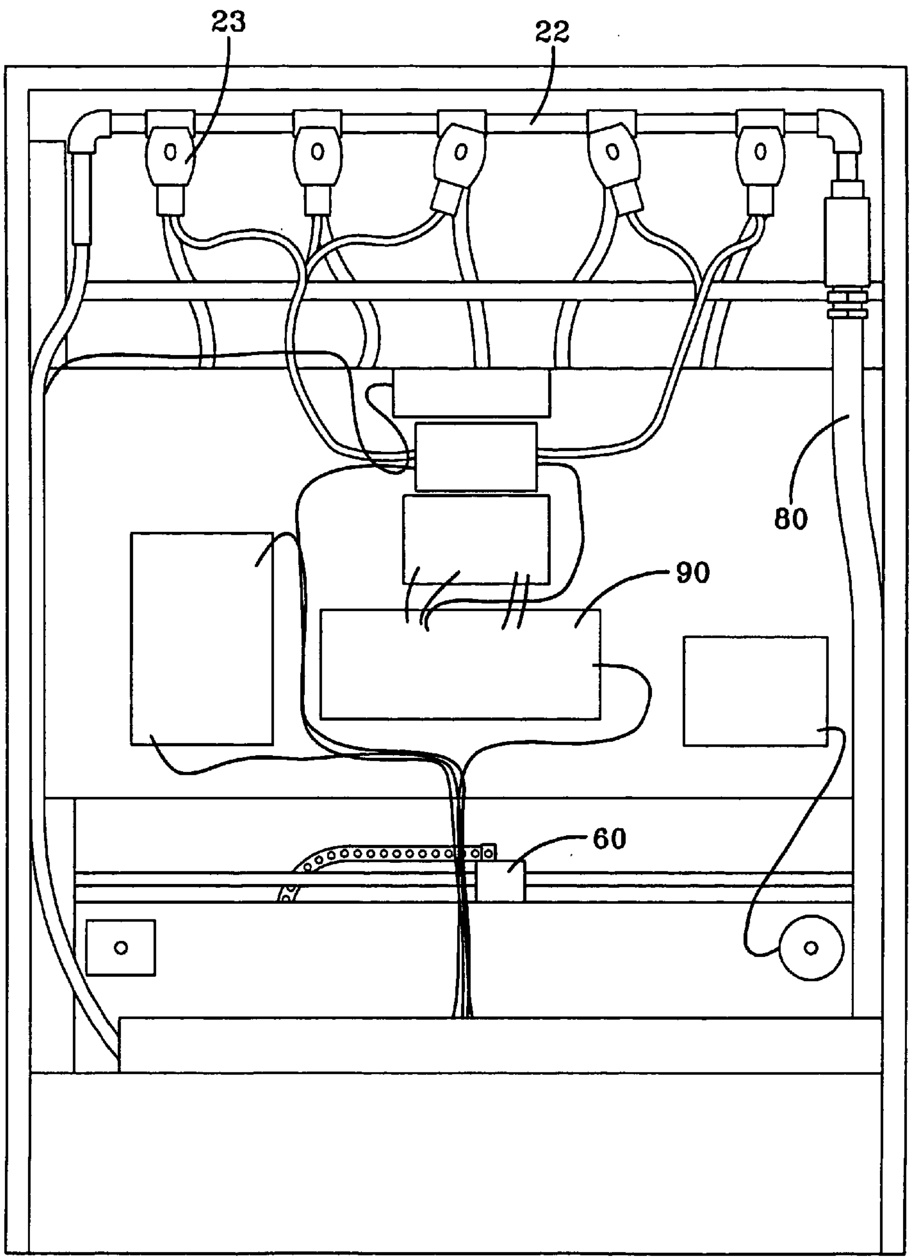
FIG. 8 is a pictorial view of an example embodiment of a game of the present invention.

FIGS. 7 and 8 show an example embodiment of a game of the present invention. As shown in FIG. 7, this embodiment of the present invention is a game comprised of a plurality 21 of liquid outlets designed to look like a beer tap 20 and a vessel designed to look like a pitcher 30 to catch a flow of water from the taps 20. A player controls the lateral motion of the pitcher 30 by a player interface such as the joystick 70. The taps 20 intermittently release liquid at rates and patterns that may be programmed on a control board. The object is to fill the pitcher 30 with water from taps 20. Also shown in this example embodiment are the liquid detection device, in this example a float valve 40, and a portion of a variable positioning mount 60 that allows for the movement of the pitcher 30. The game is a race to fill the pitcher. Coin operated versions are possible which dispense tickets or tokens to redeem for prizes. Operator versions are possible in which an operator starts the race and distributes a prize to the winner.

An example embodiment of the present invention will provide about ten player positions. The game could be an operator version. The spout and pitcher movement may be compressed air activated. The pitcher may also be moved by stepper motors to allow precise programming of the movement. The pitcher can operate at variable speeds and movement sequences that can be controlled.

As shown in FIG. 8 an interior view of an example embodiment of the present invention shows a portion of the variable positioning mount 60 that allows for the movement of the pitcher 30 (not shown). A source of delivery of a liquid 80 is shown plumbed to a manifold 22 that is connected to the respective valves 23 allowing for the delivery of liquid through the plurality 21 of taps 20 shown in FIG. 7. Also shown is a processor 90 in communication with the liquid detection device of the present invention to determine the performance of a game player, typically to determine when the vessel 30 is filled with a liquid.

The preferred embodiments herein disclosed are not intended to be exhaustive or to unnecessarily limit the scope of the invention. The preferred embodiments were chosen and described in order to explain the principles of the present invention so that others skilled in the art may practice the invention. Having shown and described preferred embodiments of the present invention, those skilled in the art will realize that many variations and modifications may be made to affect the described invention. Many of those variations and modifications will provide the same result and fall within the spirit of the claimed invention. It is the intention, therefore, to limit the invention only as indicated by the scope of the claims.

What is claimed is:

1. A racing game for at least one game player contained in a console comprising:

a liquid outlet;

a vessel to receive a liquid from said liquid outlet;

a source of said liquid for delivery through said liquid outlet to said vessel;

a liquid detection device adapted to determine a level of said liquid in said vessel;

a first variable positioning mount connected between said console and said liquid outlet;

a second variable positioning mount connected between said console and said vessel;

a processor in communication with said liquid detection device to determine the performance of said at least one game player; and a player interface controlled by said at least one game player, wherein said liquid detection device provides a signal to said processor indicating a level of said liquid in said vessel; and wherein said control by game player of said player interface moves said vessel at said second variable positioning mount.

2. The game of claim 1 wherein said console is modular.

3. The game of claim 1 additionally comprising a valve connected to said vessel, wherein said valve in an open position allows said liquid to drain from said vessel.

4. The game of claim 1 wherein said game is a race to be a first player from a plurality of said at least one game players to fill a vessel with a quantity of said liquid to a specific level.

5. The game of claim 1 wherein said game is a race within a time interval to capture a quantity of said liquid to reach a specific level of said liquid in said vessel.

6. The game of claim 1 wherein said first variable positioning mount allows said connected liquid outlet to move in a horizontal plane.

7. The game of claim 1 wherein said first variable positioning mount allows said connected liquid outlet to move in a vertical plane.

8. The game of claim 1 wherein said first variable positioning mount allows said connected liquid outlet to move in any direction.

9. The game of claim 1 wherein movement of said liquid outlet is controlled by said processor in communication with said first variable positioning mount.

10. The game of claim 9 wherein said control of said movement of said liquid outlet is comprised of a change in direction of movement of said liquid outlet.

11. The game of claim 9 wherein said control of said movement of said liquid outlet is comprised of a change in the speed of movement of said liquid outlet.

12. The game of claim 9 wherein said processor controls said movement of said liquid outlet according to a programmed pattern.

13. The game of claim 9 wherein said processor controls said movement of said liquid outlet according to a random pattern.

14. The game of claim 1 wherein said liquid outlet is comprised of an outlet selected from the group consisting of a spout, beer tap, spigot, faucet, fountain, and hose.

15. The game of claim 1 wherein said vessel is a liquid containing structure selected from the group consisting of a pitcher, beer stein, keg, barrel, bucket, cup, and drinking glass.

16. The game of claim 1 wherein said liquid detection device is comprised of an electronic switch.

17. The game of claim 1 wherein said liquid detection device is comprised of a mechanical switch.

18. The game of claim 1 wherein said liquid detection device is comprised of an electrical contact.

19. The game of claim 1 wherein said liquid detection device is comprised of an optical switch.

20. The game of claim 1 wherein said liquid detection device is comprised of a float switch.

21. The game of claim 1 wherein said player interface is comprised of a button.

22. The game of claim 1 wherein said player interface is comprised of a joystick.

23. The game of claim 1 wherein said player interface is comprised of a steering wheel.

24. The game of claim 1 wherein said delivery of said liquid from said source is continuous.

25. The game of claim 1 wherein said delivery of said liquid from said source is controlled by said processor.

26. The game of claim 1 wherein said delivery of said liquid from said source is according to a programmed pattern.

27. The game of claim 1 wherein said delivery of said liquid from said source is according to a random pattern.

28. The game of claim 1 wherein said delivery of said liquid from said source is controlled by said player.

29. The game of claim 1 wherein said delivery of said liquid from said source is from a limited quantity of said liquid.

30. A racing game for at least two game players contained in a console comprising:

a liquid outlet;

a vessel to receive a liquid from said liquid outlet;

a source of said liquid for delivery through said liquid outlet to said vessel;

a liquid detection device adapted to determine a level of said liquid in said vessel;

a first variable positioning mount connected between said console and said liquid outlet;

a second variable positioning mount connected between said console and said vessel;

a processor in communication with said liquid detection device to determine the performance of said at least one game player;

a first player interface controlled by a first game player; and a second player interface controlled by a second game player, wherein said liquid detection device provides a signal to said processor indicating a level of said liquid in said vessel;

wherein said control by said first game player at said first player interface moves said liquid outlet at said first variable positioning mount; and wherein said control by said second game player at said second player interface moves said vessel at said second variable positioning mount.

31. A racing game for at least one game player contained in a console comprising:

a plurality of liquid outlets mounted to said console;

a vessel to receive a liquid from said plurality of liquid outlets;

a source of said liquid for delivery through said plurality of liquid outlets to said vessel;

a liquid detection device adapted to determine a level of said liquid in said vessel;

a first variable positioning mount connected between said console and said vessel;

a processor in communication with said liquid detection device to determine the performance of said at least one game player; and a player interface controlled by said at least one game player, wherein said liquid detection device provides a signal to said processor indicating a level of said liquid in said vessel; and wherein said control by game player of said player interface moves said vessel at said first variable positioning mount.

32. The game of claim 31 wherein said liquid is delivered from at least one of said plurality of liquid outlets.

33. The game of claim 31 wherein said console includes a video display.

34. A racing game for at least two game players contained in a console comprising:

a plurality of liquid outlets mounted to said console;

a vessel to receive a liquid from said plurality of liquid outlets;

a source of said liquid for delivery through said plurality of liquid outlets to said vessel;

a liquid detection device adapted to determine a level of said liquid in said vessel;

a first variable positioning mount connected between said console and said vessel;

a processor in communication with said liquid detection device to determine the performance of said at least two game players;

a first player interface controlled by a first game player; and a second player interface controlled by a second game player, wherein said liquid detection device provides a signal to said processor indicating a level of said liquid in said vessel;

wherein said control by said first game player at said first player interface controls delivery of said liquid from said plurality of liquid outlets; and wherein said control by said second game player at said second player interface moves said vessel at said first variable positioning mount.

* * * * *